US010297842B2

(12) United States Patent
Nishiyama et al.

(10) Patent No.: US 10,297,842 B2
(45) Date of Patent: May 21, 2019

(54) FUEL CELL STACK (71) Applicant: HONDA MOTOR CO., LTD., Tokyo (JP)

(72) Inventors: Tadashi Nishiyama, Wako (JP); Kenji Nagumo, Wako (JP); Ryo Jinba, Wako (JP); Yoshiro Ichikawa, Wako (JP); Yuta Ikeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 218 days.

(21) Appl. No.: 15/292,121

(22) Filed: Oct. 13, 2016

(65) Prior Publication Data
US 2017/0110743 A1    Apr. 20, 2017

(30) Foreign Application Priority Data

Oct. 15, 2015   (JP) .................................. 2015-203802

(51) Int. Cl.
*H01M 8/04029* (2016.01)
*H01M 8/1018* (2016.01)
(Continued)

(52) U.S. Cl.
CPC ..... *H01M 8/04029* (2013.01); *H01M 8/0206* (2013.01); *H01M 8/04067* (2013.01); *H01M 8/04074* (2013.01); *H01M 8/1018* (2013.01); *H01M 8/24* (2013.01); *H01M 8/242* (2013.01); *H01M 8/0232* (2013.01);
(Continued)

(58) Field of Classification Search
CPC ..... H01M 2008/1095; H01M 2250/20; H01M 8/0206; H01M 8/0232; H01M 8/0234; H01M 8/04029; H01M 8/04067; H01M 8/04074; H01M 8/1018; H01M 8/24; H01M 8/242

See application file for complete search history.

(56) References Cited

U.S. PATENT DOCUMENTS 5,132,174 A * 7/1992 Romanowski .......... F28F 3/083
429/434
7,767,355 B2   8/2010 Kato et al.
(Continued)

FOREIGN PATENT DOCUMENTS

JP   2013-149595   8/2013

*Primary Examiner* — Carlos Barcena
(74) *Attorney, Agent, or Firm* — Mori & Ward, LLP (57) ABSTRACT

A fuel cell stack includes a stacked body, a first insulator and a second insulator. The stacked body includes power generation cells. The power generation cells are stacked in a stacking direction. The power generation cells include a first end power generation cell a second end power generation cell. Each of the power generation cells includes a membrane electrode assembly, a cathode separator and an anode separator. The first end power generation cell has an outermost cathode separator. The second end power generation cell has an outermost anode separator. The first insulator has a first recess in which a first heat-insulating body and a first terminal plate are accommodated. The second insulator has a second recess in which a second heat-insulating body and a second terminal plate are accommodated. A first number of first stacked heat-insulating layers is larger than a second number of second stacked heat-insulating layers.

14 Claims, 3 Drawing Sheets

(51) Int. Cl.
  *H01M 8/04007*  (2016.01)
  *H01M 8/24*  (2016.01)
  *H01M 8/242*  (2016.01)
  *H01M 8/0206*  (2016.01)
  *H01M 8/0232*  (2016.01)
  *H01M 8/0234*  (2016.01)

(52) U.S. Cl.
  CPC .. *H01M 8/0234* (2013.01); *H01M 2008/1095* (2013.01); *H01M 2250/20* (2013.01); *Y02T 90/32* (2013.01)

(56) References Cited

U.S. PATENT DOCUMENTS

| | | | |
|---|---|---|---|
| 9,368,826 B2 | 6/2016 | Kobayashi et al. | |
| 2002/0187380 A1* | 12/2002 | Tanaka | H01M 8/04067 429/425 |
| 2010/0068599 A1 | 3/2010 | Furusawa et al. | |
| 2013/0004876 A1* | 1/2013 | Suzuki | H01M 8/04007 429/434 |
| 2013/0164646 A1* | 6/2013 | Kobayashi | H01M 8/04067 429/434 |
| 2014/0212785 A1* | 7/2014 | Kobayashi | H01M 8/04067 429/465 |

\* cited by examiner

FUEL CELL STACK

CROSS-REFERENCE TO RELATED APPLICATIONS

The present application claims priority under 35 U.S.C. § 119 to Japanese Patent Application No. 2015-203802, filed Oct. 15, 2015, entitled "Fuel Cell Stack." The contents of this application are incorporated herein by reference in their entirety.

BACKGROUND OF THE INVENTION

Field of the Invention
The present disclosure relates to a fuel cell stack.
Discussion of the Background
In general, a solid polymer electrolyte fuel cell includes a solid polymer electrolyte membrane, which is a polymer ion-exchange membrane. The fuel cell includes a membrane electrode assembly (MEA), in which an anode electrode is disposed on one surface of the solid polymer electrolyte membrane and a cathode electrode is disposed on the other surface of the solid polymer electrolyte membrane. The anode electrode and the cathode electrode each include a catalyst layer (electrode catalyst layer) and a gas diffusion layer (porous carbon).

The membrane electrode assembly and a cathode separator and an anode separator that sandwich the membrane electrode assembly constitute a power generation cell (unit fuel cell). An oxidant gas flows over the cathode separator along an electrode surface. A fuel gas flows over the anode separator along the electrode surface. A predetermined number of power generation cells are stacked and used, for example, as a vehicle fuel cell stack.

In the fuel cell stack, the temperatures of some of the power generation cells tend to decrease more easily than those of other power generation cells due to dissipation of heat to the outside. For example, the temperature of a power generation cell that is disposed at an end in the stacking direction (hereinafter, referred to as an "end power generation cell") decreases particularly easily, because heat of the end power generation cell is dissipated to the outside through an electric power output terminal plate (collector plate), an end plate, and the like.

For example, Japanese Unexamined Patent Application Publication No. 2013-149595 describes a fuel cell stack for solving this problem. The fuel cell stack includes a stacked body in which power generation cells are stacked; and terminal plates, insulation members, and end plates disposed on both sides of the stacked body in the stacking direction. At least one of the insulation members has a recess that has an opening facing the stacked body. A heat-insulating member and a terminal plate are accommodated in the recess.

It is described that, with such a structure, dissipation of heat from the outer peripheries of the heat-insulating member and the terminal plate can be effectively suppressed; a decrease in the temperature of an end power generation cell, which is disposed in an end portion of the stacked body, can be reliably suppressed; and the fuel cell stack can maintain high power generation performance.

SUMMARY OF THE INVENTION

According to one aspect of the present invention, a fuel cell stack includes a stacked body, insulators, and end plates. A plurality of power generation cells is stacked in the stacked body in a stacking direction. Each of the power generation cells includes a membrane electrode assembly and a cathode separator and an anode separator sandwiching the membrane electrode assembly. The membrane electrode assembly includes an electrolyte membrane and electrodes disposed on both sides of the electrolyte membrane. An oxidant gas flows over the cathode separator along an electrode surface and a fuel gas flows over the anode separator along the electrode surface. The insulators are disposed on both sides of the stacked body in the stacking direction and have recesses in which heat-insulating members and terminal plates are accommodated. The end plates are disposed outside of the insulators. A first end power generation cell, which is one of the power generation cells disposed at one end of the stacked body in the stacking direction, has the cathode separator in an outermost part thereof in the stacking direction. A second end power generation cell, which is one of the power generation cells disposed at the other end of the stacked body in the stacking direction, has the anode separator in an outermost part thereof in the stacking direction. The number of stacked layers included in one of the heat-insulating members adjacent to the first end power generation cell is larger than the number of stacked layers included in the other heat-insulating member adjacent to the second end power generation cell.

According to another aspect of the present invention, a fuel cell stack includes a stacked body, a first insulator, a second insulator, a first end plate, and a second end plate. The stacked body includes power generation cells. The power generation cells are stacked in a stacking direction. The power generation cells include a first end power generation cell disposed at a first end of the stacked body in the stacking direction and a second end power generation cell disposed at a second end of the stacked body opposite to the first end in the stacking direction. Each of the power generation cells includes a membrane electrode assembly, a cathode separator and an anode separator. The membrane electrode assembly includes an electrolyte membrane and cathode and anode electrodes sandwiching the electrolyte membrane therebetween. The cathode separator and the anode separator sandwiching the membrane electrode assembly therebetween. An oxidant gas flows over the cathode separator along the cathode electrode. A fuel gas flows over the anode separator along the anode electrode. The first end power generation cell has an outermost cathode separator provided at a first outermost part of the stacked body in the stacking direction. The second end power generation cell has an outermost anode separator provided at a second outermost part of the stacked body in the stacking direction. The first insulator is provided at the first end of the stacked body and has a first recess in which a first heat-insulating body and a first terminal plate are accommodated. The first heat-insulating body is in contact with the outermost cathode separator. The first heat-insulating body has at least one first stacked heat-insulating layer. The second insulator is provided at the second end of the stacked body and has a second recess in which a second heat-insulating body and a second terminal plate are accommodated. The second heat-insulating body is in contact with the outermost anode separator. The second heat-insulating body has at least one second stacked heat-insulating layer. A first number of the at least one first stacked heat-insulating layer is larger than a second number of the at least one second stacked heat-insulating layer. The first end plate and the second end plate are provided to sandwich the first insulator and the second insulator which sandwich the stacked body therebetween in the stacking direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
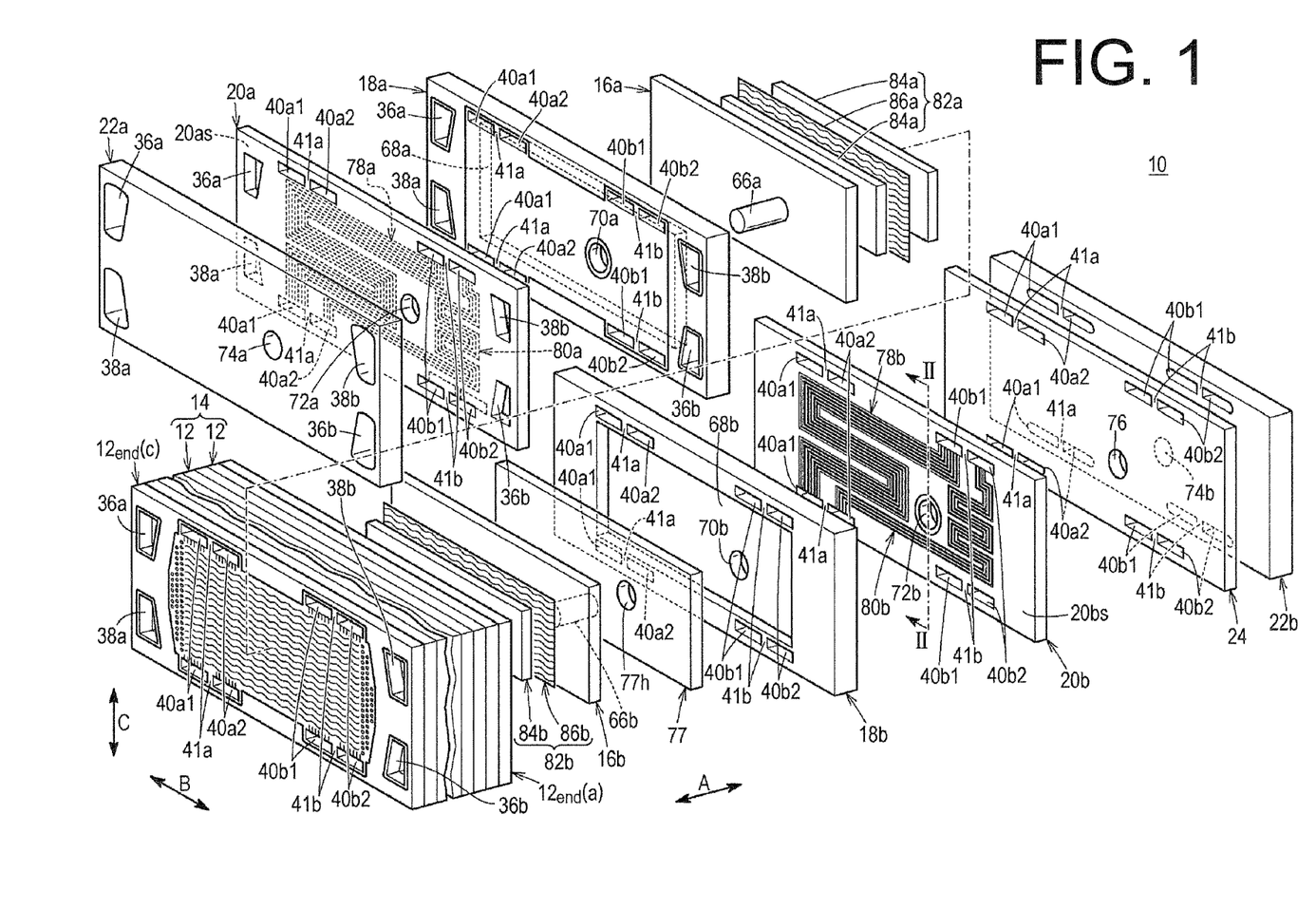
FIG. 1 is an exploded perspective view of a fuel cell stack according to an embodiment of the present disclosure.

Referring to FIG. 1, a fuel cell stack 10 according to an embodiment of the present disclosure includes a stacked body 14 in which a plurality of power generation cells 12 are stacked in a horizontal direction (direction of arrow A), or in a vertical direction (direction of arrow C). The fuel cell stack 10 is used, for example, for a fuel cell electric automobile (not shown) as a vehicle fuel cell stack.

Figure 2:
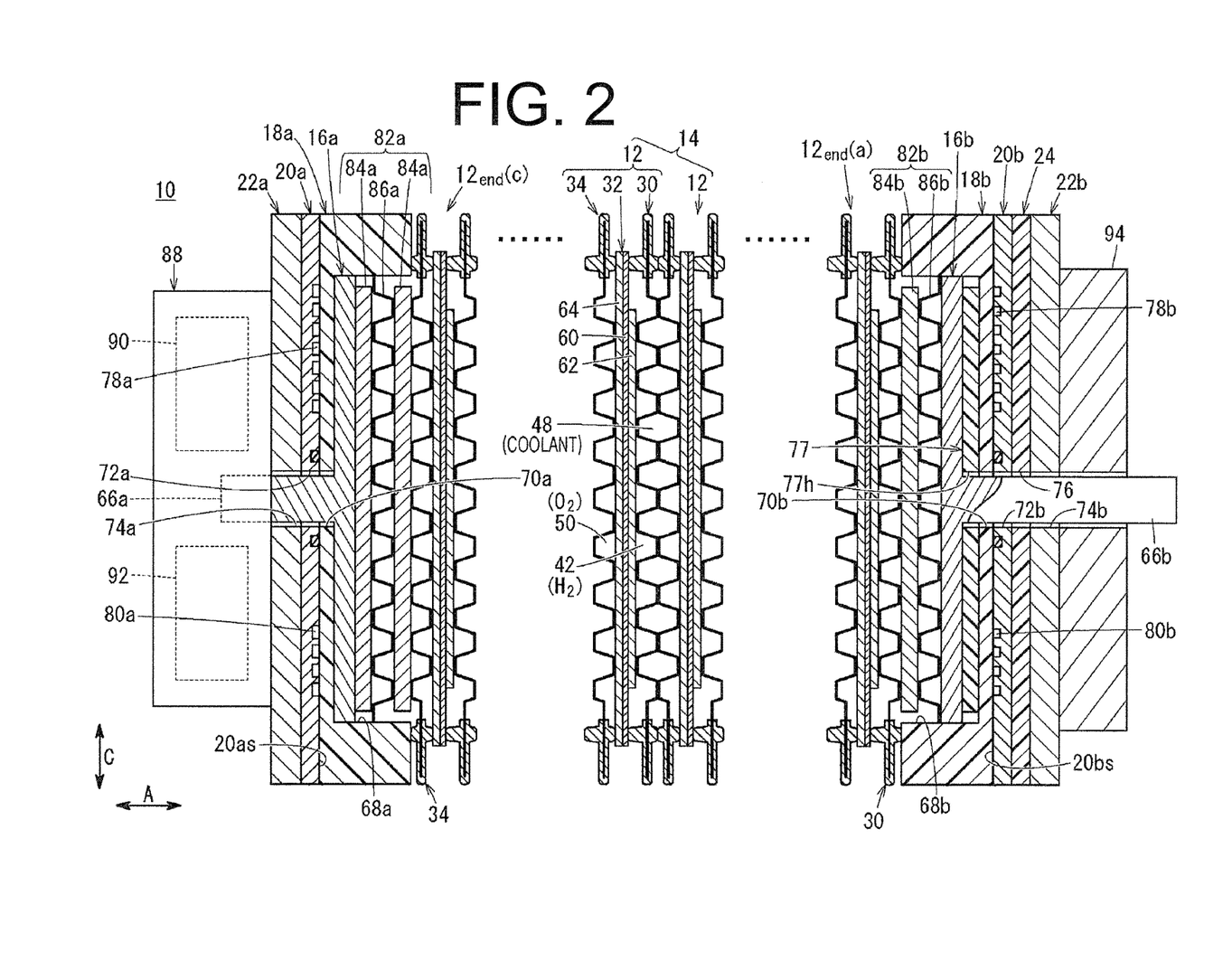
FIG. 2 is a sectional view of the fuel cell stack taken along line II-II of FIG. 1.

Referring to FIGS. 1 and 2, a first end power generation cell $12_{end}$(c) is disposed at one end of the stacked body 14 in the stacking direction (direction of arrow A). A second end power generation cell $12_{end}$ (a) is disposed at the other end of the stacked body 14 in the stacking direction. As described below, the first end power generation cell $12_{end}$ (C) includes a cathode separator 34 in an outermost part thereof in the stacking direction. The second end power generation cell $12_{end}$ (a) includes an anode separator 30 in an outermost part thereof in the stacking direction.

On the first end power generation cell $12_{end}$(c), a terminal plate 16a, an insulation member 18a, a temperature-adjusting plate 20a, and an end plate 22a are arranged outward in the stacking direction. On the second end power generation cell $12_{end}$ (a), a terminal plate 16b, an insulation member 18b, a temperature-adjusting plate 20b, a resin plate 24 for adjusting fastening load, and an end plate 22b are arranged outward in the stacking direction.

The fuel cell stack 10 is integrally held by a box-shaped casing (not shown) that has the end plates 22a and 22b (having, for example, rectangular shapes) as end panels thereof. The fuel cell stack 10 may be integrally fastened and held by using a plurality of tie-rods (not shown) extending, for example, in the direction of arrow A.

Figure 3:
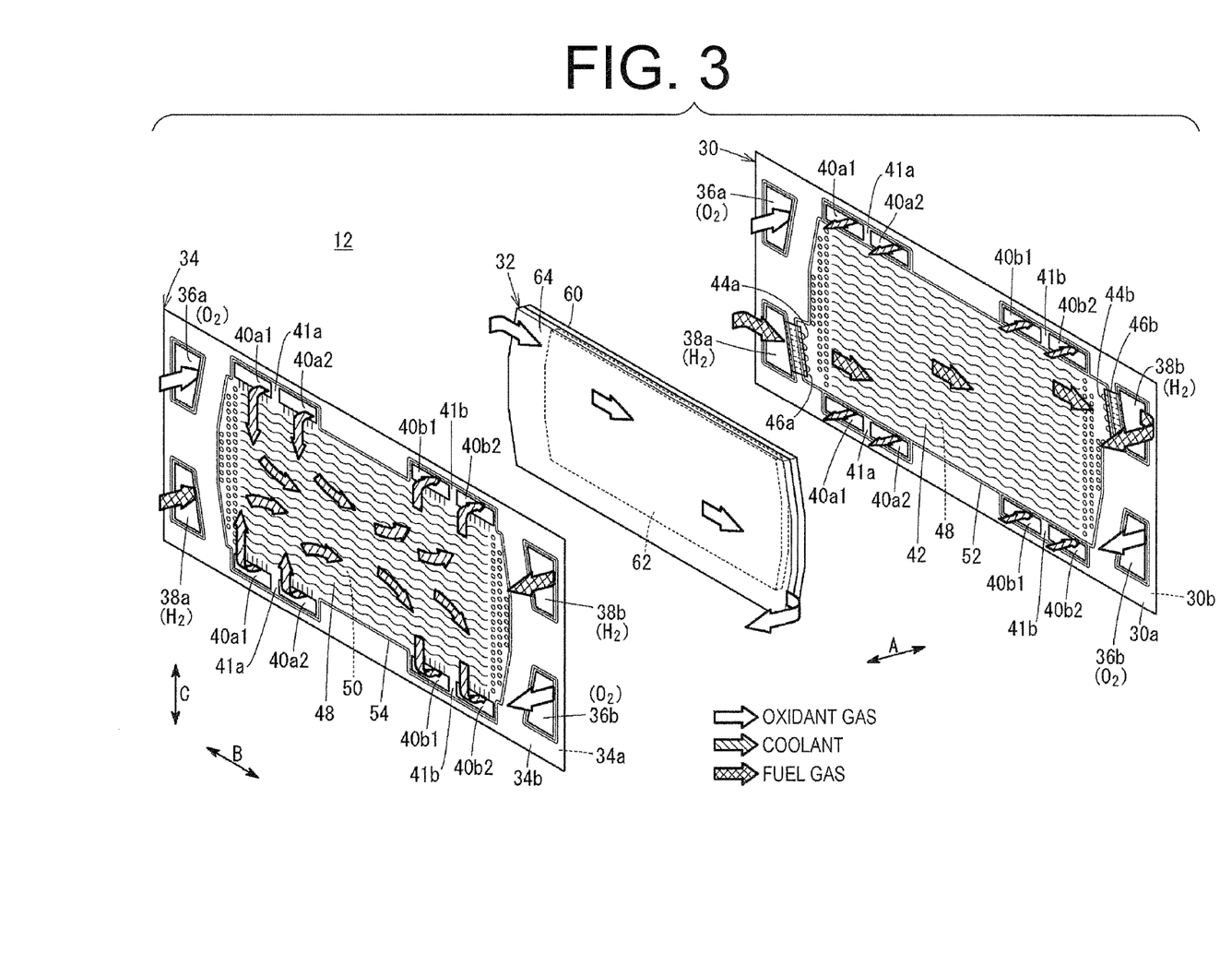
FIG. 3 is an exploded perspective view of a power generation cell included in the fuel cell stack.

Referring to FIGS. 2 and 3, each of the power generation cells 12 includes an anode separator 30, a membrane electrode assembly (MEA) 32, and a cathode separator 34. The anode separator 30 and the cathode separator 34 are each made from a laterally-elongated metal plate, such as a steel plate, a stainless steel plate, an aluminum plate, or a galvanized steel plate.

Instead of the metal separators, carbon separators may be used as the anode separator 30 and the cathode separator 34. The power generation cell 12 may include a first separator, a first MEA, a second separator, a second MEA, and a third separator that are stacked. The power generation cell 12 may include three or more MEAS and five or more separators.

Referring to FIG. 3, an oxidant gas inlet manifold 36a and a fuel gas inlet manifold 38a are disposed in the power generation cell 12 so as to extend in the stacking direction (the direction of arrow A) through one end portion of the power generation cell 12 in the longitudinal direction (direction of arrow B) (horizontal direction). An oxidant gas, such as an oxygen-containing gas, is supplied through the oxidant gas inlet manifold 36a. A fuel gas, such as a hydrogen-containing gas, is supplied through the fuel gas inlet manifold 38a.

A fuel gas outlet manifold 38b and an oxidant gas outlet manifold 36b are disposed in the power generation cell 12 so as to extend in the direction of arrow A through the other end portion of the power generation cell 12 in the longitudinal direction (direction of arrow B). The fuel gas is discharged through the fuel gas outlet manifold 38b. The oxidant gas is discharged through the oxidant gas outlet manifold 36b. The oxidant gas inlet manifold 36a, the oxidant gas outlet manifold 36b, the fuel gas inlet manifold 38a, and the fuel gas outlet manifold 38b may be disposed so that the oxidant gas and the fuel gas form counter flows.

Two pairs of coolant inlet manifolds 40a1 and 40a2 are respectively disposed in the power generation cell 12 so as to extend in the direction arrow A through two (upper and lower) end portions (that are near the oxidant gas inlet manifold 36a) of the power generation cell 12 in the transversal direction (direction of arrow C) (vertical direction). A coolant is supplied through the coolant inlet manifolds 40a1 and 40a2. The coolant inlet manifolds 40a1 and 40a2 each have a horizontally elongated rectangular opening. Each pair of the coolant inlet manifolds 40a1 and 40a2 are independently formed so as to be separated from each other by providing a rib portion 41a between the coolant inlet manifolds 40a1 and 40a2.

Two pairs of coolant outlet manifolds 40b1 and 40b2 are respectively disposed in the power generation cell 12 so as to extend in the direction arrow A through two (upper and lower) end portions (that are near the oxidant gas outlet manifold 36b) of the power generation cell 12 in the transversal direction. The coolant is discharged through the coolant outlet manifolds 40b1 and 40b2. The coolant outlet manifolds 40b1 and 40b2 each have a horizontally elongated rectangular opening. Each pair of the coolant outlet manifolds 40b1 and 40b2 are independently formed so as to be separated from each other by providing a rib portion 41b between the coolant outlet manifolds 40b1 and 40b2.

The rib portion 41a may be removed to form the coolant inlet manifolds 40a1 and 40a2 into a single coolant inlet manifold. The rib portion 41b may be removed to form the coolant outlet manifolds 40b1 and 40b2 into a single coolant outlet manifold. The fuel gas inlet manifold 38a and the fuel gas outlet manifold 38b may be interchanged with each other.

A fuel gas channel 42, which is connected to the fuel gas inlet manifold 38a and the fuel gas outlet manifold 38b, is formed on a surface 30a of the anode separator 30 facing the membrane electrode assembly 32. The fuel gas channel 42 includes a plurality of wave-shaped channel grooves (or linear channel grooves).

The fuel gas inlet manifold 38a and the fuel gas channel 42 are connected to each other through a plurality of inlet connection channels 44a. The fuel gas outlet manifold 38b and the fuel gas channel 42 are connected to each other through a plurality of outlet connection channels 44b. The inlet connection channels 44a and the outlet connection channels 44b are respectively covered by a cover member 46a and a cover member 46b.

A part of a coolant channel 48 is formed a surface 30b of the anode separator 30. The coolant channel 48 connects the two pairs of coolant inlet manifolds 40a1 and 40a2 and the two pairs of coolant outlet manifolds 40b1 and 40b2 to each other.

An oxidant gas channel 50, which is connected to the oxidant gas inlet manifold 36a and the oxidant gas outlet manifold 36b, is formed on a surface 34a of the cathode separator 34 facing the membrane electrode assembly 32. The oxidant gas channel 50 includes a plurality of wave-shaped channel grooves (or linear channel grooves). A part of the coolant channel 48 is formed on a surface 34b of the cathode separator 34.

A first sealing member 52 is integrally formed on the surfaces 30a and 30b of the anode separator 30 so as to surround the outer peripheral end portion of the anode separator 30. A second sealing member 54 is integrally formed on the surfaces 34a and 34b of the cathode separator 34 so as to surround the outer peripheral end portion of the cathode separator 34.

The first sealing member 52 and the second sealing member 54 are each made of an elastic material, such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene rubber, and acrylic rubber.

Referring to FIGS. 2 and 3, the membrane electrode assembly 32 includes a solid polymer electrolyte membrane 60, which is, for example, a thin film that is made of a perfluorosulfonic acid polymer including water. The solid polymer electrolyte membrane 60 is sandwiched between an anode electrode 62 and a cathode electrode 64. The membrane electrode assembly 32 is a stepped MEA in which the planer dimensions of the anode electrode 62 are smaller than those of the cathode electrode 64. Alternatively, the anode electrode 62 may have planer dimensions larger than those of the cathode electrode 64. The anode electrode 62 and the cathode electrode 64 may have the same planar dimensions.

The anode electrode 62 and the cathode electrode 64 each include a gas diffusion layer (not shown) and an electrode catalyst layer (not shown). The gas diffusion layer is made of carbon paper or the like. The electrode catalyst layer is formed by uniformly coating a surface of the gas diffusion layer with porous carbon particles whose surfaces support a platinum alloy. The electrode catalyst layers are formed on both sides of the solid polymer electrolyte membrane 60.

Referring to FIG. 1, electric power output terminals 66a and 66b, which extend outward in the stacking direction, are respectively disposed at positions separated from the centers of the surfaces of the terminal plates 16a and 16b (or may be disposed at the centers of the surfaces of the terminal plates 16a and 16b). Preferably, the electric power output terminals 66a and 66b are disposed at positions closer to the coolant outlet manifolds 40b1 and 40b2 of the coolant channel 48 than to the coolant inlet manifolds 40a1 and 40a2.

The insulation members 18a and 18b are each made of an electrically-insulating material, such as polycarbonate (PC) or a phenol resin. Referring to FIGS. 1 and 2, a recessed portion 68a, which has a rectangular shape, is formed in a central part of a surface of the insulation member 18a facing the terminal plate 16a. A hole 70a is formed in the insulation member 18a so as to be connected to the recessed portion 68a. The electric power output terminal 66a of the terminal plate 16a extends through the hole 70a in the insulation member 18a, a hole 72a in the temperature-adjusting plate 20a, and a hole 74a in the end plate 22a, and is exposed to the outside.

A recessed portion 68b, which has a rectangular shape, is formed in a central part of a surface of the insulation member 18b facing the terminal plate 16b. A hole 70b is formed in the insulation member 18b so as to be connected to the recessed portion 68b. The electric power output terminal 66b of the terminal plate 16b is inserted into a hole 77h in an electrically-insulating resin spacer 77, which is disposed on a bottom surface of the recessed portion 68b of the insulation member 18b. The electric power output terminal 66b extends through the hole 70b in the insulation member 18b, a hole 72b in the temperature-adjusting plate 20b, a hole 76 in the resin plate 24, and a hole 74b in the end plate 22b, and is exposed to the outside.

Referring to FIG. 1, the two pairs of coolant inlet manifolds 40a1 and 40a2 and the two pairs of coolant outlet manifolds 40b1 and 40b2 are formed in the insulation members 18a and 18b, the temperature-adjusting plates 20a and 20b, the resin plate 24, and the end plate 22b. The oxidant gas inlet manifold 36a, the oxidant gas outlet manifold 36b, the fuel gas inlet manifold 38a, and the fuel gas outlet manifold 38b are formed in the insulation member 18a, the temperature-adjusting plate 20a, and the end plate 22a.

A coolant passage is formed on a surface 20as of the temperature-adjusting plate 20a facing the insulation member 18a. A temperature-adjusting medium, such as a coolant, flows through the coolant passage in a direction along a plate surface of the end plate 22a.

The coolant passage includes a plurality of (for example, seven) first coolant passages 78a, which have meandering shapes and which are connected to the coolant inlet manifold 40a1 disposed below the coolant passage and to the coolant outlet manifold 40b1 disposed above the coolant passage. The coolant passage includes a plurality of (for example, four) first coolant passages 80a, which have meandering shapes and which are connected to the coolant inlet manifold 40a2 disposed below the coolant passage and to the coolant outlet manifold 40b2 disposed above the coolant passage.

A coolant passage is formed on a surface 20bs of the temperature-adjusting plate 20b facing the insulation member 18b. The coolant flows through the coolant passage in a direction along a plate surface of the end plate 22b.

The coolant passage includes a plurality of (for example, seven) second coolant passages 78b, which have meandering shapes and which are connected to the coolant inlet manifold 40a1 disposed below the coolant passage and to the coolant outlet manifold 40b1 disposed above the coolant passage. The coolant passage includes a plurality of (for example, four) second coolant passages 80b, which have meandering shapes and which are connected to the coolant inlet manifold 40a2 disposed below the coolant passage and to the coolant outlet manifold 40b2 disposed above the coolant passage.

Referring to FIGS. 1 and 2, an electrically-conductive heat-insulating member 82a and the terminal plate 16a are accommodated in the recessed portion 68a of the insulation member 18a. The electrically-conductive heat-insulating member 82a includes, for example, one second heat-insulating member 86a sandwiched between two first heat-insulating members 84a. Each of the first heat-insulating members 84a is made from, for example, a carbon plate. The second heat-insulating members 86a is made by, for example, forming a metal plate so as to have recessed portions and protruding portions and air voids between the recessed and protruding portions.

An electrically-conductive heat-insulating member 82b, the terminal plate 16b, and the resin spacer 77 are accommodated in the recessed portion 68b of the insulation member 18b. The electrically-conductive heat-insulating member 82b includes, for example, one first heat-insulating member 84b and one second heat-insulating member 86b.

The electrically-conductive heat-insulating members 82a and 82b each may be any member having air voids and having electrical conductivity. Examples of the material of the heat-insulating members 82a and 82b include a metal foam, a honeycomb metal (honeycomb member), or porous carbon (for example, carbon paper), each of which having electrical conductivity.

Referring to FIG. 2, the first end power generation cell $12_{end}$ (c) is disposed at an end of the stacked body 14 adjacent to the terminal plate 16a. The second end power generation cell $12_{end}$ (a) is disposed at an end of the stacked body 14 adjacent to the terminal plate 16b. A stacked body, including a plurality of power generation cells 12 that are stacked, is interposed between the first end power generation cell $12_{end}$(c) and the second end power generation cell $12_{end}$ (a).

A metal cover plate 88 is attached to the end plate 22a. For example, an ejector 90 and a pump 92, for circulating the fuel gas, and the like are accommodated in the metal cover plate 88. An external coolant manifold 94, for circulating the coolant, is attached to the end plate 22b.

An operation of the fuel cell stack 10, which is structured as described above, will be described.

Referring to FIG. 1, an oxidant gas, such as an oxygen-containing gas, is supplied to the oxidant gas inlet manifold 36a of the end plate 22a. A fuel gas, such as a hydrogen-containing gas, is supplied to the fuel gas inlet manifold 38a of the end plate 22a. A coolant, such as pure water, ethylene glycol, an oil, or the like, is supplied to each pair of coolant inlet manifolds 40a1 and 40a2 of the end plate 22b.

Referring to FIG. 3, the oxidant gas flows into the oxidant gas channel 50 of the cathode separator 34 from the oxidant gas inlet manifold 36a. The oxidant gas is supplied to the cathode electrode 64 of the membrane electrode assembly 32 while flowing in the direction of arrow B.

The fuel gas flows into the fuel gas channel 42 of the anode separator 30 from the fuel gas inlet manifold 38a. The fuel gas is supplied to the anode electrode 62 of the membrane electrode assembly 32 while flowing along the fuel gas channel 42 in the direction of arrow B.

Accordingly, in the membrane electrode assembly 32, the oxidant gas supplied to the cathode electrode 64 and the fuel gas supplied to the anode electrode 62 cause electrochemical reactions in the electrode catalyst layers, and thereby electric power is generated.

The oxidant gas, which has been supplied to the cathode electrode 64 and consumed, is discharged along the oxidant gas outlet manifold 36b in the direction of arrow A. Likewise, the fuel gas, which has been supplied to the anode electrode 62 and consumed, is discharged along the fuel gas outlet manifold 38b in the direction of arrow A.

Referring to FIG. 3, the coolant, which has been supplied to the coolant inlet manifolds 40a1 and 40a2, flows into the coolant channel 48 between the anode separator 30 of the power generation cell 12 and the cathode separator 34 of an adjacent power generation cell 12. A part of the coolant supplied to one of the pairs coolant inlet manifolds 40a1 and 40a2 and a part of the coolant supplied to the other pair of coolant inlet manifolds 40a1 and 40a2 flow in the directions of arrow C so as to approach each other. Then, the coolant flows in the direction of arrow B (the longitudinal direction of the separators) and cools the membrane electrode assembly 32. Next, the coolant flows in the directions of arrow C so as to be separated into parts and discharged from the two pairs of coolant outlet manifolds 40b1 and 40b2.

Referring to FIG. 1, the first coolant passages 78a and 80a are disposed on the temperature-adjusting plate 20a, and the second coolant passages 78b and 80b are disposed on the temperature-adjusting plate 20b.

Therefore, on the temperature-adjusting plate 20a, the coolant flows into the first coolant passages 78a and 80a from the coolant inlet manifolds 40a1 and 40a2 below the first coolant passages 78a and 80a. The coolant flows upward while meandering along the first coolant passages 78a and 80a. Then, the coolant is discharged to the coolant outlet manifolds 40b1 and 40b2 above the first coolant passages 78a and 80a.

On the temperature-adjusting plate 20b, the coolant flows into the second coolant passages 78b and 80b from the coolant inlet manifolds 40a1 and 40a2 below the second coolant passages 78b and 80b. The coolant flows upward while meandering along the second coolant passages 78b and 80b. Then, the coolant is discharged to the coolant outlet manifolds 40b1 and 40b2 above the second coolant passages 78b and 80b.

In the present embodiment, in particular, due to the structures of the end portions of the fuel cell stack 10 and the like, the amount of heat dissipated from the second end power generation cell $12_{end}$ (a) tends to be smaller than the amount of heat dissipated from the first end power generation cell $12_{end}$ (c). To be specific, referring to FIG. 2, the resin plate 24 and the external coolant manifold 94 are disposed adjacent to the end plate 22b. Accordingly, the amount of heat dissipated from the second end power generation cell $12_{end}$ (a) tends to be small, and therefore the second end power generation cell $12_{end}$ (a) might become overheated.

To prevent this, in the present embodiment, the electrically-conductive heat-insulating member 82a, which is located adjacent to the first end power generation cell $12_{end}$ (c), includes two first heat-insulating members 84a and one second heat-insulating member 86a, which is sandwiched between the first heat-insulating members 84a. Thus, the electrically-conductive heat-insulating member 82a includes three stacked layers. The electrically-conductive heat-insulating member 82b, which is located adjacent to the second end power generation cell $12_{end}$ (a), includes one first heat-insulating member 84b and one second heat-insulating member 86b. Thus, the electrically-conductive heat-insulating member 82b includes two stacked layers. In this case, the number of the first heat-insulating member 84b adjacent to the second end power generation cell $12_{end}$ (a) is one, and the resin spacer 77 is additionally disposed near the second end power generation cell $12_{end}$ (a).

As described above, the number of stacked layers included in the electrically-conductive heat-insulating member 82b (two) is smaller than the number (three) of stacked layers included in the electrically-conductive heat-insulating member 82a. Thus, heat can be effectively dissipated from the second end power generation cell $12_{end}$ (a). Therefore, an advantage is obtained in that overheating of the second end power generation cell $12_{end}$ (a) can be suppressed with a simple and economical structure by only reducing (changing) the number of stacked layers included in the electrically-conductive heat-insulating member 82b.

In the present embodiment, the number stacked layers included in the electrically-conductive heat-insulating member 82a is three, and the number of stacked layers included in the electrically-conductive heat-insulating member 82b is two. However, this is not restricted. The number of stacked layers included in the electrically-conductive heat-insulating member 82*a* may be any number, as long as it is smaller than the number of stacked layers included in the electrically-conductive heat-insulating member 82*b*.

According to the present disclosure, a fuel cell stack includes a stacked body in which a plurality of power generation cells is stacked in a stacking direction. Each of the power generation cells includes a membrane electrode assembly and a cathode separator and an anode separator sandwiching the membrane electrode assembly, the membrane electrode assembly including an electrolyte membrane and electrodes disposed on both sides of the electrolyte membrane. An oxidant gas flows over the cathode separator along an electrode surface, and a fuel gas flows over the anode separator along the electrode surface. The fuel cell stack includes insulators that are disposed on both sides of the stacked body in the stacking direction and that have recesses in which heat-insulating members and terminal plates are accommodated; and end plates disposed outside of the insulators.

In the fuel cell stack, a first end power generation cell, which is one of the power generation cells disposed at one end of the stacked body in the stacking direction, has the cathode separator in an outermost part thereof in the stacking direction; and a second end power generation cell, which is one of the power generation cells disposed at the other end of the stacked body in the stacking direction, has the anode separator in an outermost part thereof in the stacking direction. The number of stacked layers included in one of the heat-insulating members adjacent to the first end power generation cell is larger than the number of stacked layers included in the other heat-insulating member adjacent to the second end power generation cell.

In the fuel cell stack, preferably, a resin spacer is disposed between one of the terminal plates adjacent to the second end power generation cell and a corresponding one of the insulators.

In the fuel cell stack, preferably, a temperature-adjusting plate, along which a temperature-adjusting medium flows, is interposed between each of the insulators and a corresponding one of the end plates. In this case, preferably, a resin plate is disposed between one of the temperature-adjusting plates adjacent to the second end power generation cell and a corresponding one of the end plates.

In the fuel cell stack, preferably, an external coolant manifold is disposed on an outer surface of one of the end plates adjacent to the second end power generation cell, the external coolant manifold supplying and discharging a coolant that flows through the stacked body.

In the fuel cell stack, preferably, a metal cover plate is disposed on an outer surface of one of the end plates adjacent to the first end power generation cell.

Due to the structures of end portions of the fuel cell stack and the like, in particular, the amount of heat dissipated from the second end power generation cell, in which the fuel gas flows in an outermost part thereof in the stacking direction, tends to be smaller than the amount of heat dissipated from the first end power generation cell, in which the oxidant gas flows in an outermost part thereof in the stacking direction. Therefore, the second end power generation might become overheated. To prevent this, with the present disclosure, the number of stacked layers included in one of the heat-insulating members adjacent to the second end power generation cell is made smaller. Thus, a larger amount of heat can be dissipated from the second end power generation cell. Accordingly, overheating of the end power generation cell can be suppressed with a simple and economical structure by only changing the number of stacked layers included in the heat-insulating member.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell stack comprising:
a stacked body in which a plurality of power generation cells are stacked in a stacking direction, each of the power generation cells including a membrane electrode assembly and a cathode separator and an anode separator sandwiching the membrane electrode assembly, the membrane electrode assembly including an electrolyte membrane and electrodes disposed on both sides of the electrolyte membrane, wherein an oxidant gas flows over the cathode separator along an electrode surface and a fuel gas flows over the anode separator along the electrode surface;
insulators that are disposed on both sides of the stacked body in the stacking direction and that have recesses in which heat-insulating members and terminal plates are accommodated; and
end plates disposed outside of the insulators,
wherein a first end power generation cell, which is one of the power generation cells disposed at one end of the stacked body in the stacking direction, has the cathode separator in an outermost part thereof in the stacking direction,
wherein a second end power generation cell, which is one of the power generation cells disposed at the other end of the stacked body in the stacking direction, has the anode separator in an outermost part thereof in the stacking direction,
wherein a stack end structure located outward in the stacking direction with respect to the terminal plate on a second end power generation cell side of the fuel cell stack has a structure with heat dissipation less than a stack end structure located outward in the stacking direction with respect to the terminal plate on a first end power generation cell side of the fuel cell stack,
wherein the number of stacked layers included in one of the heat-insulating members adjacent to the second end power generation cell is smaller than the number of stacked layers included in the other heat-insulating member adjacent to the first end power generation cell, and
wherein the number of stacked layers included in the one of the heat-insulating members includes at least one first stacked heat-insulating layer and the number of stacked layers included in the other of the heat-insulating members includes at least one second stacked heat-insulating layer.

2. The fuel cell stack according to claim 1, wherein a resin spacer is disposed between one of the terminal plates adjacent to the second end power generation cell and a corresponding one of the insulators.

3. The fuel cell stack according to claim 1, wherein a temperature-adjusting plate, along which a temperature-adjusting medium flows, is interposed between each of the insulators and a corresponding one of the end plates, and wherein a resin plate is disposed between one of the temperature-adjusting plates adjacent to the second end power generation cell and a corresponding one of the end plates.

4. The fuel cell stack according to claim 1, wherein an external coolant manifold is disposed on an outer surface of one of the end plates adjacent to the second end power generation cell, the external coolant manifold supplying and discharging a coolant that flows through the stacked body.

5. The fuel cell stack according to claim 1, wherein a metal cover plate is disposed on an outer surface of one of the end plates adjacent to the first end power generation cell.

6. The fuel cell stack according to claim 1, wherein the number of stacked layers included in the one of the heat-insulating members is three.

7. The fuel cell stack according to claim 6, wherein the number of stacked layers included in the other of the heat-insulating members is two.

8. A fuel cell stack comprising:
a stacked body comprising:
    power generation cells stacked in a stacking direction and including a first end power generation cell disposed at a first end of the stacked body in the stacking direction and a second end power generation cell disposed at a second end of the stacked body opposite to the first end in the stacking direction, each of the power generation cells comprising:
        a membrane electrode assembly including an electrolyte membrane and cathode and anode electrodes sandwiching the electrolyte membrane therebetween;
        a cathode separator and an anode separator sandwiching the membrane electrode assembly therebetween;
        an oxidant gas being to flow over the cathode separator along the cathode electrode; and
        a fuel gas being to flow over the anode separator along the anode electrode;
    the first end power generation cell having an outermost cathode separator provided at a first outermost part of the stacked body in the stacking direction; and
    the second end power generation cell having an outermost anode separator provided at a second outermost part of the stacked body in the stacking direction;
a first insulator provided at the first end of the stacked body and having a first recess in which a first heat-insulating body and a first terminal plate are accommodated, the first heat-insulating body being in contact with the outermost cathode separator, the first heat-insulating body having at least one first stacked heat-insulating layer;

a second insulator provided at the second end of the stacked body and having a second recess in which a second heat-insulating body and a second terminal plate are accommodated, the second heat-insulating body being in contact with the outermost anode separator, the second heat-insulating body having at least one second stacked heat-insulating layer, a first number of the at least one first stacked heat-insulating layer being larger than a second number of the at least one second stacked heat-insulating layer; and a first end plate and a second end plate provided to sandwich the first insulator and the second insulator which sandwich the stacked body therebetween in the stacking direction, wherein a stack end structure located outward in the stacking direction with respect to the second terminal plate on a second end power generation cell side of the fuel cell stack has a structure with heat dissipation less than a stack end structure located outward in the stacking direction with respect to the first terminal plate on a first end power generation cell side of the fuel cell stack.

9. The fuel cell stack according to claim 8, wherein a resin spacer is disposed between the second terminal plate and the second insulator.

10. The fuel cell stack according to claim 8, wherein a first temperature-adjusting plate, along which a temperature-adjusting medium flows, is interposed between the first insulator and the first end plate, wherein a second temperature-adjusting plate, along which a temperature-adjusting medium flows, is interposed between the second insulator and the second end plate, and wherein a resin plate is disposed between the second temperature-adjusting plate and the second end plates.

11. The fuel cell stack according to claim 8, wherein an external coolant manifold is disposed on an outer surface of the second end plate, the external coolant manifold supplying and discharging a coolant that flows through the stacked body.

12. The fuel cell stack according to claim 8, wherein a metal cover plate is disposed on an outer surface of the first end plate.

13. The fuel cell stack according to claim 8, wherein the first number of the at least one first stacked heat-insulating layer is three.

14. The fuel cell stack according to claim 13, wherein the second number of the at least one second stacked heat-insulating layer is two.

* * * * *